(12) United States Patent
Yam et al.

(10) Patent No.: US 12,423,143 B2
(45) Date of Patent: Sep. 23, 2025

(54) SYSTEM, METHOD, AND DEVICE FOR INGESTING DATA INTO REMOTE COMPUTING ENVIRONMENTS

(71) Applicant: The Toronto-Dominion Bank, Toronto (CA)

(72) Inventors: Andrew Kai Ming Yam, Mississauga (CA); Adrian Ariel Ionescu, Vaughan (CA); Upal Sayeed Hossain, Toronto (CA); George Knapp, Mullica Hill, NJ (US)

(73) Assignee: The Toronto-Dominion Bank, Toronto (CA)

( * ) Notice: Subject to any disclaimer, the term of this patent is extended or adjusted under 35 U.S.C. 154(b) by 591 days.

(21) Appl. No.: 17/813,786

(22) Filed: Jul. 20, 2022

(65) Prior Publication Data
US 2024/0028398 A1    Jan. 25, 2024

(51) Int. Cl.
*G06F 9/50* (2006.01)
*G06F 9/445* (2018.01)

(52) U.S. Cl.
CPC ........ *G06F 9/5016* (2013.01); *G06F 9/44505* (2013.01); *G06F 9/5072* (2013.01)

(58) Field of Classification Search
CPC .................................................. G06F 9/5016
See application file for complete search history.

(56) References Cited

U.S. PATENT DOCUMENTS

| | | | |
|---|---|---|---|
| 8,732,213 B2 | 5/2014 | Sowell et al. | |
| 8,949,175 B2 | 2/2015 | Wu et al. | |
| 10,579,447 B2 | 3/2020 | Deligia et al. | |
| 10,949,440 B2 | 3/2021 | Schoueri et al. | |
| 12,020,077 B1* | 6/2024 | Rohatgi | G06F 9/505 |
| 2010/0180128 A1* | 7/2010 | Borden | G06F 16/137 |
| | | | 709/224 |
| 2017/0078144 A1* | 3/2017 | Purusothaman | H04L 41/0813 |
| 2020/0210443 A1 | 7/2020 | Srinivasan et al. | |
| 2022/0197667 A1* | 6/2022 | Hu | G06F 8/63 |
| 2023/0140109 A1* | 5/2023 | Dasi | G06F 16/258 |
| | | | 707/602 |
| 2023/0418842 A1* | 12/2023 | Gminder | G06F 16/27 |

OTHER PUBLICATIONS

Armbrust, Michael et al.; Delta lake; high performance ACID table storage over cloud object stores; Proceedings of the VLDB Endowment (vol. 13, Issue 12) pp. 3411-3424, Aug. 1, 2020; https://databricks.com/jp/wp-content/uploads/2020/08/p975-armbrust.pdf.

* cited by examiner

*Primary Examiner* — Charlie Sun
(74) *Attorney, Agent, or Firm* — CPST Intellectual Property Inc.; Brett J. Slaney

(57) ABSTRACT

A system, device, and method for ingesting data into a remote computing environment are provided. The example device comprises a processor, a communications module, and a memory. The processor executes instructions on the memory to receive a data file, and extract metadata from the data file. The extracted metadata comprises at least one property of the data file. A configuration file, from a plurality of configuration files, that is associated with the data file is determined. The determination is performed, at least in part, based on correlating the extracted metadata with data file types used by the determined configuration file. The data file is ingested for storage in a remote computing environment based on the determined configuration file.

20 Claims, 13 Drawing Sheets

SYSTEM, METHOD, AND DEVICE FOR INGESTING DATA INTO REMOTE COMPUTING ENVIRONMENTS

TECHNICAL FIELD

The following relates generally to methods of transferring data from premise(s) into remote computing environment(s).

BACKGROUND

Enterprises increasingly rely upon remote, and possibly distributed, computing environments (e.g., cloud computing environments), as compared to local computing resources within their control (alternatively referred to as on-premises or on-prem resources), to implement their digital infrastructure.

Transitioning data files from on-premises resources to remote computing environments can require implementing a framework capable of migrating potentially vast amounts of data generated regularly for existing operations, or of migrating potentially vast amounts of legacy data. Adding to this challenge, the data being uploaded can be heterogeneous, and be uploaded from various applications as configured by the existing on-premises resource. Other differences in the data being uploaded, the source of the data, or the frameworks implemented by the existing on premises infrastructure to process or store the data can further complicate transition efforts.

Implementing a framework for migrating local data to a remote computing environment, which is any one of fast, efficient, accurate, robust, modular, adaptable, and cost-effective is desirable.

BRIEF DESCRIPTION OF THE DRAWINGS

Embodiments will now be described with reference to the appended drawings wherein.

DETAILED DESCRIPTION

Figure 1:
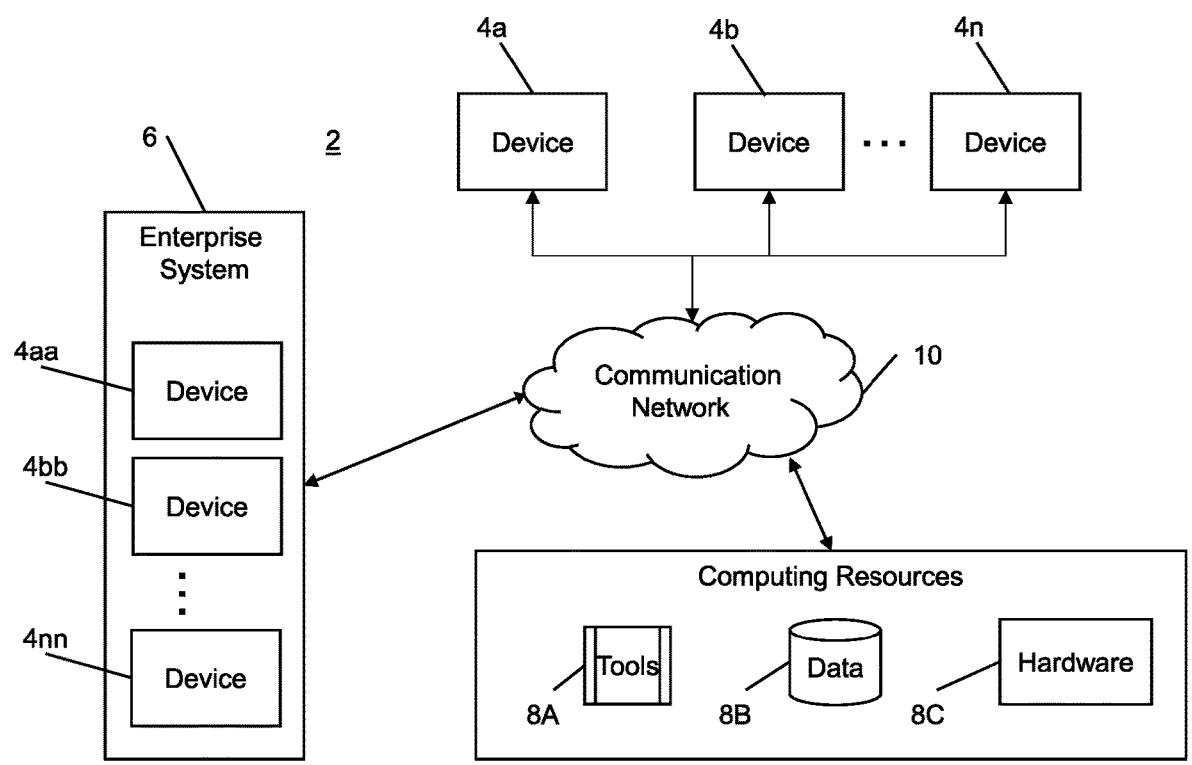
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The following generally relates to a framework for uploading heterogeneous data files into a remote (e.g., cloud-based) computing environment based on a configuration file. The framework includes extracting metadata from a data file to be ingested, and determining a configuration file from a plurality of configuration files for use in ingesting the data file based on the extracted metadata. The configuration file is at least in part determined by correlating the metadata with the data file types the configuration file processes. For example, the configuration file may be generated to process mainframe files from a particular on-premises system, with parameters responsive to idiosyncrasies of the on-premises system. In this way, the disclosed framework can allow for a modular ingestion protocol, where the framework sorts through incoming data files from a plurality of sources to correlate to one of a plurality of configuration files to be associated with the incoming data file. The configuration files themselves can be adapted or updated over time, increasing the robustness of the system.

In example embodiments, the configuration file is stored separately from the extracted metadata used to generate the configuration file. For example, the configuration file can be a file separate from a database used to store extracted metadata. In this way, the computational effort required to sort through a database of metadata can be avoided with separate persisted configuration files. Moreover, the configuration files, which are typically smaller than the database, can be persisted in a location conducive to increasing the speed of ingesting the data files.

The configuration files can be generated with the extracted metadata from the data file and one or more parameters received via a template. The template can specify the mapping between the format from which the data file originates to the format of the remote computing environment, and possibly account for any idiosyncrasies associated with the source of the data file. The template can constrain user input to only allowable options for uploading data files into the remote computing environment. In this way, the configuration file can define parameters to both parse through the data file, and resolve and ingest data within the data file. This potentially further increases the modularity and robustness of the proposed framework In one aspect, a device for ingesting data into remote computing environments is disclosed. The device includes a processor, a communications module coupled to the processor, and a memory coupled to the processor. The memory stores computer executable instructions that when executed by the processor cause the processor to receive a data file and extract metadata from the data file. The extracted metadata includes at least one property of the data file. The instructions cause the processor to determine a configuration file, from a plurality of configuration files, that is associated with the data file at least in part based on correlating the extracted metadata with data file types used by the determined configuration file. The instructions cause the processor to ingest the data file for storage in a remote computing environment based on the determined configuration file.

In example embodiments, the data file is received from one or more on-premises systems using a landing zone.

In example embodiments, the determined configuration file includes one or more validation parameters for validating the data file during ingestion.

In example embodiments, the instructions cause the processor to ingest an additional data file associated with the data file for storage in the remote computing environment. The additional data file is ingested based on the determined configuration file.

In example embodiments, the determined configuration file includes parsing parameters and mapping parameters for storing parsed data from the data file in the remote computing environment. The parsing parameters can include at least one of filtering parameter to identify data that is not being ingested. The mapping parameters can include one or more parameters defining a destination of the ingested data file and one or more processing pattern parameters for the data file. The one or more processing pattern parameters can identify whether the data file is an iterative data file or a new data file.

In example embodiments, the extracted metadata is stored in a database, the determined configuration file is stored in a separate file, and the processor accesses the determined configuration file to ingest data.

In example embodiments, the instructions cause the processor to use the extracted metadata to generate a new configuration file for the data file. The determined configuration file for ingestion can be the new configuration file. The determined configuration file can be generated based on the extracted metadata and parameters provided via a user interface. The user interface can be based on a template for processing metadata to create configuration files.

In another aspect, a method for ingesting data into remote computing environments is disclosed. The method includes receiving a data file, and extracting metadata from the data file. The extracted metadata includes at least one property of the data file. The method includes determining a configuration file, from a plurality of configuration files, that is associated with the data file at least in part based on correlating the extracted metadata with data file types used by the determined configuration file. The method includes ingesting the data file for storage in a remote computing environment based on the determined configuration file.

In example embodiments, the data file is received from one or more on-premises systems using a landing zone.

In example embodiments, the determined configuration file includes one or more validation parameters for validating the data file during ingestion.

In example embodiments, the method includes ingesting an additional data file associated with the data file for storage in the remote computing environment, based on the determined configuration file.

In example embodiments, the determined configuration file comprises parsing parameters and mapping parameters for storing parsed data from the data file in the remote computing environment. The parsing parameters can include at least one of filtering parameter to identify data that is not being ingested.

In example embodiments, the extracted metadata is stored in a database, the determined configuration file is stored in a separate file, and the processor accesses the determined configuration file to ingest data.

In yet another aspect, a non-transitory computer readable medium (CRM) for ingesting data into remote computing environments is disclosed. The CRM includes computer executable instructions for receiving a data file, and extracting metadata from the data file. The extracted metadata includes at least one property of the data file. The computer executable instructions are for determining a configuration file, from a plurality of configuration files, that is associated with the data file at least in part based on correlating the extracted metadata with data file types used by the determined configuration file. The computer executable instructions are for ingesting the data file for storage in a remote computing environment based on the determined configuration file.

Referring now to FIG. 1, an exemplary computing environment 2 is illustrated. In the example embodiment shown, the computing environment 2 includes an enterprise system 6, one or more devices 4 (shown as devices 4a, 4b, 4n, external to the enterprise system 6, and devices 4aa, 4bb, and 4nn, internal to the enterprise system 6), and a remote computing environment 8 (shown individually as tool(s) 8A, database(s) 8B, and hardware 8C). Each of these components can be connected by a communications network 10 to one or more other components of the computing environment 2. In at least some example embodiments, all the components shown in FIG. 1 are within the enterprise system 6.

The one or more devices 4 may hereinafter be referred to in the singular for ease of reference. An external device 4 can be operated by a party other than the party which controls the enterprise system 6; conversely, an internal device 4 can be operated by the party in control of the enterprise system 6. Any device 4 can be used by different users, and with different user accounts. For example, the internal device 4 can be used by an employee, third party contractor, customer, etc., as can the external device 4. The user may be required to be authenticated prior to accessing the device 4, the device 4 can be required to be authenticated prior to accessing either the enterprise system 6 or the remote computing environment 8, or any specific accounts or resources within computing environment 2.

The device 4 can access information within the enterprise system 6 or remote computing environment 8 in a variety of ways. For example, the device 4 can access the enterprise system 6 via a web-based application, or a dedicated application (e.g., uploading module 912 of FIG. 9), etc. Access can require the provisioning of different types of credentials (e.g., login credentials, two factor authentication, etc.). In example embodiments, each different device 4 can be provided with a unique degree of access, or variations thereof. For example, the internal device 4 can be provided with a greater degree of access to the enterprise system 6 as compared to the external device 4.

Devices 4 can include, but are not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The remote computing environment 8 (hereinafter referred to in the alternative as computing resources 8) includes resources which are stored or managed by a party other than operator of the enterprise system 6 and are used by, or available to, the enterprise system 6. For example, the computing resources 8 can include cloud-based storage services (e.g., database(s) 8B). In at least some example embodiments, the computing resources 8 include one or more tools 8A developed or hosted by the external party, or tools 8A for interacting with the computing resources 8. In at least one contemplated embodiment, the tool 8A (referred to in the singular for ease of reference) is a tool for managing data lakes, and more specifically a tool for scheduling writing to a data lake associated with the Microsoft™ Azure™ data storage and processing platform. Further particularizing the example, the tool 8A can allow a device 4 (e.g., internal device 4aa) to access the computing resources 8, and to configure an ingestion procedure wherein different data files are assigned or otherwise processed within the computing resources 8 based on a configuration file. The tool 8A can be or include aspects of a machine learning tool, or a tool associated with the Delta Lake Storage (ALDS)™ suite, etc. The computing resources 8 can also include hardware resources 8C, such as access to processing capability of server devices (e.g., cloud computing), and so forth.

Communication network 10 may include a telephone network, cellular, and/or data communication network to connect distinct types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 or the computing resources 8, or between devices 4, wherein an internal or other shared network provides the necessary communications infrastructure.

The computing environment 2 can also include a cryptographic server or module (e.g., encryption module 1012 of FIG. 10) for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 8, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 6 or device 4. The cryptographic server may be used to protect data within the computing environment 2 (e.g., including data stored in database(s) 8B) by way of encryption for data protection, digital signatures or message digests for data integrity, and by using digital certificates to authenticate the identity of the users and entity devices with which the enterprise system 6, computing resources 8, or the device 4 communicates, to inhibit data breaches by adversaries. It can be appreciated that various cryptographic mechanisms and protocols can be chosen and implemented to suit the constraints and requirements of the computing environment 2, as is known in the art.

The enterprise system 6 can be understood to encompass the whole of the enterprise, a subset of a wider enterprise system (not shown), such as a system serving a subsidiary or a system for a particular branch or team of the enterprise (e.g., a resource migration division of the enterprise). In at least one example embodiment, the enterprise system 6 is a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc. Financial institutions can generate vast amounts of data, and have vast amounts of existing records, both of which can be difficult to migrate into a digital and remote computing environment, securely and accurately.

The enterprise system 6 can request, receive a request to, or have implemented thereon (at least in part), a method for uploading data from an on-premises location or framework onto the computing resources 8. For example, the requests may be part of an automated data settlement scheme used by the system 6 to maintain data sets within the computing resources 8.

Figure 2:
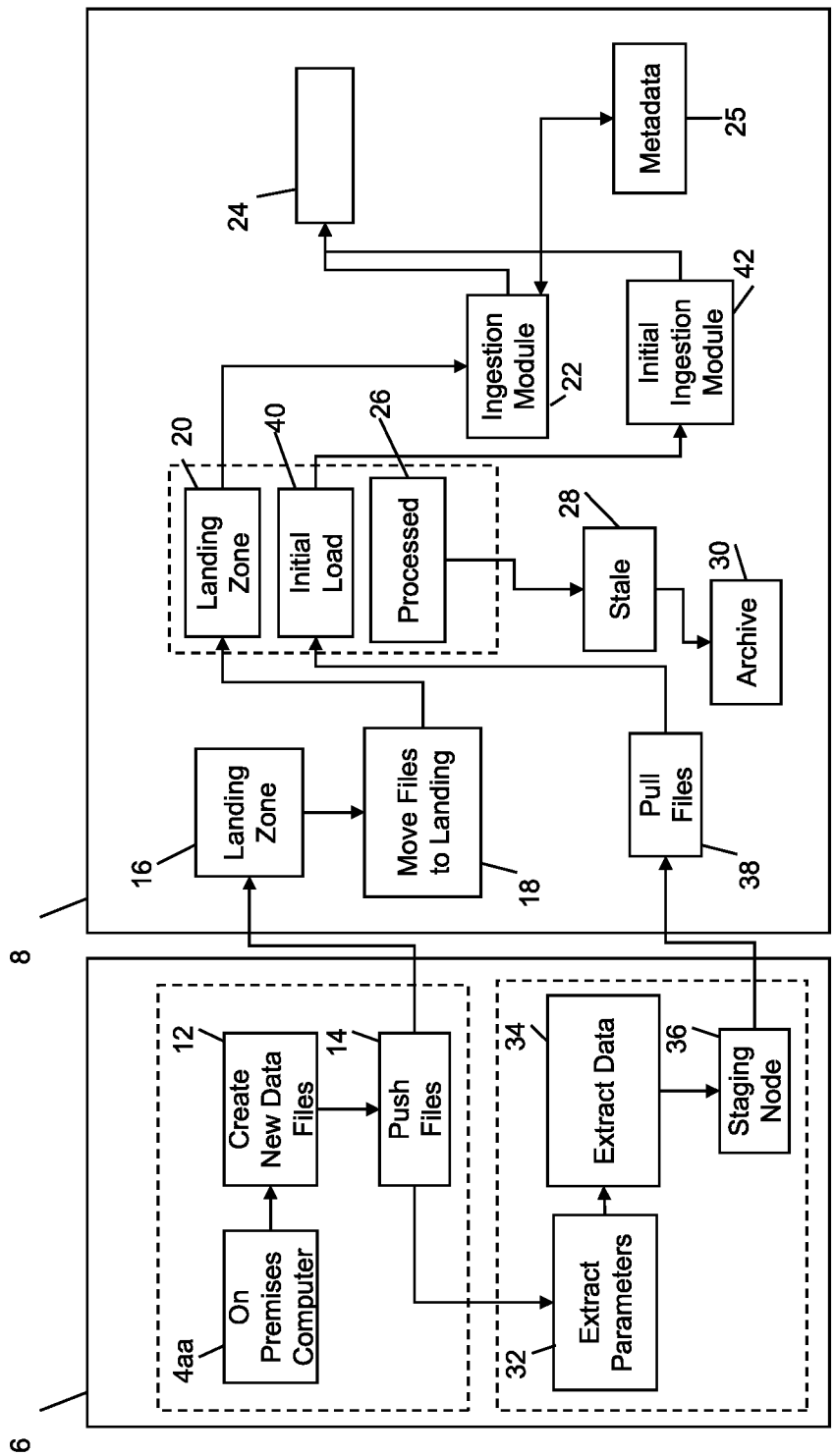
FIG. 2 is a diagram illustrating data moving through a framework for transmitting local data to a remote computing environment.

FIG. 2 is a diagram illustrating data file(s) (hereinafter referred to in the plural, for ease of reference) flowing through a framework for migrating local data files onto a remote computing environment. The disclosed framework may address some of the issues in the discussed existing solutions. In the embodiment shown in FIG. 2, the shown enterprise system 6 is considered to be wholly on-premises, solely for illustrative purposes.

At block 12, an internal device 4aa creates or has stored thereon (or has access to), a set of data files that are to be migrated onto the computing resources 8. For example, the internal device 4aa can be a device operated by an employee to enact a change in a customer bank account within a first application (e.g., generates a data file to open a new bank account). In another example, the internal device 4aa can be operated to change certain login credentials for a banking customer with a second application (e.g., generates a data file to update existing authentication records). In yet another example, the internal device 4aa can retrieve and generate data files related to stock trades executed for customers with a third application. The preceding examples highlight the potentially heterogeneous nature of the data files, and the heterogeneous nature of the applications used to generate or manage the data files. It is understood that the preceding examples demonstrate simplified singular instances of generating a data file or data set, and that this disclosure contemplates scenarios involving a set of files being generated (e.g., the number of files generated by a small business, or a large multinational business, and everything in between).

At block 14, the data files are pushed into the computing resources 8. In example embodiments, the block 14 denotes a platform for pushing data into the computing resources 8. For example, a functionality in block 14 may be provided by an application (hereinafter the originating application for pushing data) which (1) retrieves data files from the device 4aa for uploading to the computing resources 8, and (2) schedules the pushing of the retrieved data files into the computing resources 8 via available transmission resources. In respect of the retrieval, the originating application may include one or more parameters enabling the originating application to cooperate with various data generating applications. For example, the originating application can include an application programming interface (API) to interact with the data required to be retrieved from an ATM, and to interact with data files required to be retrieved from a personal computing device, etc. The application generating the data files can also be configured to store the data files for uploading within a central repository which is periodically checked by the originating application. In at least some example embodiments, the originating application can be configured to encrypt sensitive data, for example with the cryptographic server or module described herein.

The one or more parameters of the originating application can also control the scheduling of when data files are pushed. For example, the originating application can be configured to push data files periodically. In at least some example embodiments, the originating application can be in communication with another application of the computing resources 8 (e.g., landing zone 16) to coordinate pushing data files from the internal device 4 to the computing resources 8 in instances where the computing resources 8 can process the pushed data files in a timely manner.

In at least some example embodiments, the originating application is implemented on the computing resources 8, and instead of being configured to push data is instead configured to pull data files from the enterprise system 6 into the computing resources 8. For example, the originating application can be an application on the computing resources 8 that periodically checks a central repository on the internal device 4aa designated for storage of data files to be uploaded to the computing resources 8.

Transmitted on-premises data arrives in a landing zone 16 within the computing resources 8. The landing zone 16 can be preconfigured to immediately move or reassign the arrived data to the control of another application (hereinafter referred to as the cloud administration application) at block 18. In at least some example embodiments, the cloud administration application and the originating application are different functionalities of a single application.

The landing zone 16 can be configured to store data files temporarily, unless one or more criteria are satisfied. For example, the landing zone 16 can be configured to remove all data files more than 15 minutes old unless the device 4 or user account requesting uploading of the data files is authenticated. In example embodiments, the landing zone 16 requires authentication via an access token procedure. The access token and temporary storage configuration can be used to enforce a time sensitive authentication method to minimize potential damage associated with the risk of the access token being exposed.

Upon satisfactory authentication (e.g., where the device 4aa is pre-authenticated, or where the landing zone 16 relies upon authentication administered on the device 4, etc.), the data files stored thereon can be immediately pushed, via block 18, to the landing zone 20. In example embodiments, various scheduling techniques can be employed to move data between the landing zones. For example, data files stored in the landing zone 16 can be transferred to the landing zone 20 only in response to determining, by the cloud administration application, that certain traffic parameters are satisfied. Continuing the example, data files may only be transferred between the landing zones once the landing zone 20 has capacity, or is estimated to have capacity, to process the received data within a time specified by a traffic parameter.

Data files within the landing zone 20 are subsequently transmitted to the ingestion module 22.

The ingestion module 22 consumes data files for persistent storage in the computing resources 8 (e.g., the persistent storage denoted by the remote computing environment 24). In at least some example embodiments, the ingestion module 22 can standardize and/or validate data files being consumed, and/or extract metadata related to the request to upload data files for persistent storage. The ingestion module 22 can process the data files being consumed based on a configuration file 23 (FIG. 3) stored within a metadata repository 25.

At block 32, data files which do not have a configuration file 23 within the computing resources 8, or are previously unknown to the computing resources 8 are processed. The data files from block 12 may be processed to extract one or more parameters related to storing the data on the computing resources 8. For example, the data files can be processed to extract parameters defining the properties of the data file. Properties can include the number of columns within the data file, the value ranges for each of the entries within a particular column, etc.

Figure 3:
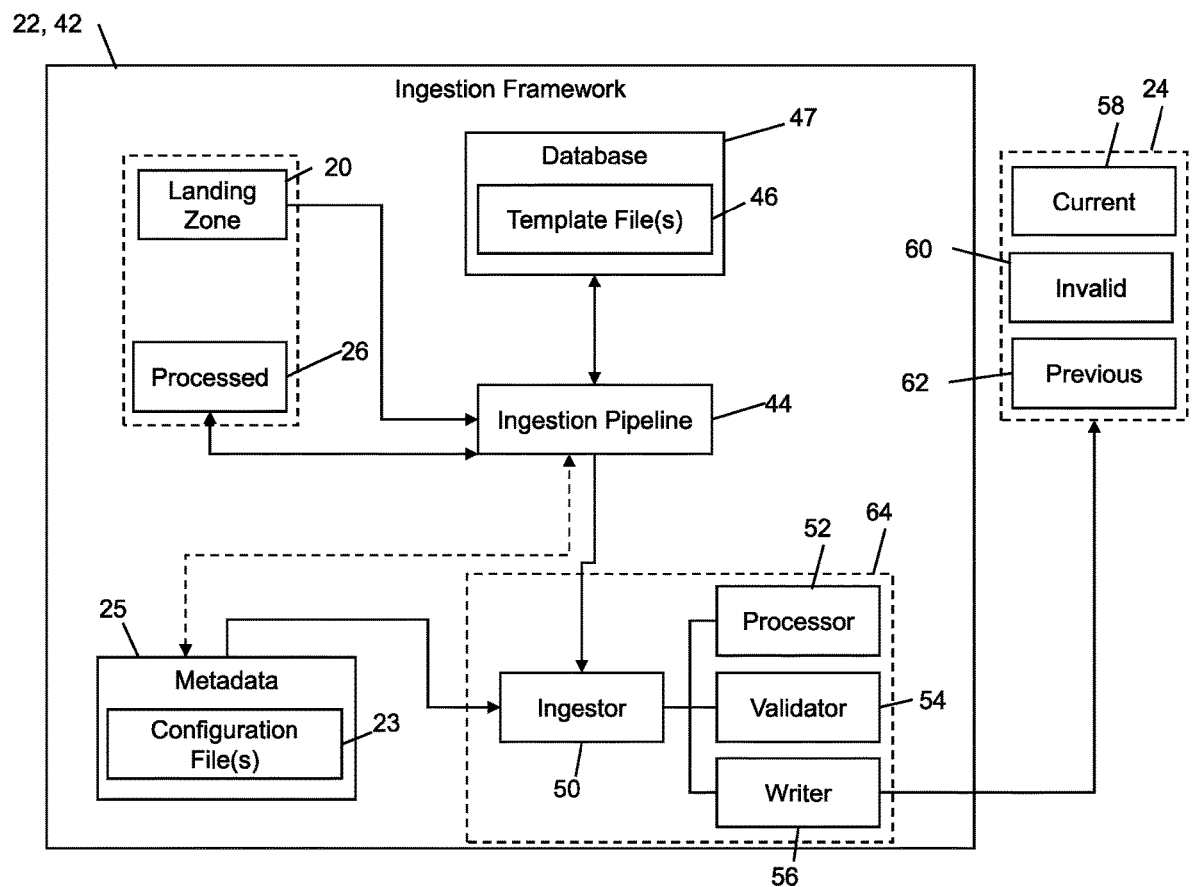
FIG. 3 is a diagram of an example ingestion framework.

Block 32 may require that any data files being uploaded to the computing resources 8 for the first time are accompanied with or include one or more template files 46 for operations (e.g., stored in template repository 47 of FIG. 3).

Block 32 or block 34 can also include a verification step (not shown). For example, the request, or the template file(s) 46, can be reviewed by a developer to ensure that it is consistent with approaches employed by the computing resources 8. It may be that the developer is required to subsequently transfer the configuration file 23 generated from the template file 46 to the metadata repository 25 to initiate the process of storing files on the remote computing environment 8.

At block 34, historical data associated with the data files created or designated for ingestion in block 12 can be extracted. This historical data can include metadata such as the author of the data, the relevant section of the enterprise system 6 with which the data should be associated, the application generating the data, and so forth. In at least some example embodiments, the historical data can include previous versions of, or stale data related to, the new data file being uploaded to the computing resources 8 (e.g., the historical data can include seven years of past data associated with the new data file). For example, the parameters can include stale data comprising previous transactions in a financial institution enterprise system 6.

At block 36, the data processed at blocks 32 and 34 is moved to a staging node or loading zone for uploading to the computing resources 8. In example embodiments, the staging node or loading zone denoted by block 36 includes an originating application like originating application discussed in respect of landing zone 16. For example, computing hardware on the enterprise system 6 may be scheduled to transmit data files for uploading to the computing resources 8 overnight, to reduce load on the enterprise system 6. In another example, the staging or loading zone denoted by block 36 can be configured to first transmit time sensitive information for storage to the computing resources 8. For example, transactions may be given special priority for uploading to the computing resources 8.

Landing zone 38, similar to landing zone 16, receives the data files from block 36 within the computing resources 8.

Landing zone 40, similar to landing zone 20, receives the data files from landing zone 38, and transmits same to an initial ingestion module 42.

Similar to the landing zone 20, an originating application can be used to control the flow of data from the landing zone 40 to the initial ingestion module 42. The initial ingestion module 42, similar to the ingestion module 22, consumes data for persistent storage in the remote computing resources 8 (e.g., in a segregated or separate remote computing environment 24).

Although not shown to maintain visual clarity, data for tracking the flow of data files within the framework (hereinafter tracking data), which tracking data is related to data files that are queued for consumption by the ingestion module 22 or the initial ingestion module 42, can be stored on the computing resources 8. In example embodiments, the tracking data includes at least one of metadata related to the data files (e.g., creating date, originating application, etc.), data related to the requests to upload the data file (e.g., time of request, originating system, etc.), parts of the data file (e.g., entries, hash values of individual data files, etc.), or some combination thereof.

The tracking data can be stored in a variety of ways. In at least one contemplated example embodiment, transmitting the data files to the ingestion module 22 can trigger the tracking data to be sent to the processed database 26. Tracking data within the processed database 26 can be stored only for a predefined amount of time (e.g., 30 days), after which it is sent to the stale database 28, and after a predefined amount of time (e.g., one year), the stale database 28 or controller associated therewith can migrate data into an archive 30. In at least some contemplated example embodiments, the tracking data can be provided to the template repository 47 (FIG. 3) for storage. In example embodiments, the processed database 26, the stale database 28, and the archive 30 are aspects of the template repository 47.

FIG. 3 shows a diagram of an example ingestion framework, being either the ingestion module 22 or the initial ingestion module 42 (hereinafter discussed predominantly in respect of ingestion module 22, for simplicity).

In FIG. 3, the landing zone 20 and the processed database 26 are shown as within the ingestion module 22, as is the metadata repository 25. It is understood that the shown configuration is illustrative (e.g., a different configuration is shown in FIG. 2 where the landing zone 20, for example, is external to the ingestion module 22), and is not intended to be limiting. For this reason, there is an additional broken lined box surrounding the landing zone 20 and the processed database 26.

The ingestion pipeline 44 receives data files stored within the landing zone 20. In example embodiments, the ingestion pipeline 44 is implemented within a data factory environment of the computing resources 8.

The ingestion pipeline 44 can communicate with the template repository 47 to assign or ingest data files.

The template repository 47 can store one or more template files 46 (hereinafter referred to in the singular, for ease of reference) that can be used to identify parameters of the data file being ingested, or for ingestion of the data file. For example, the one or more template files can include an Internet Database Connector (IDC) template file 46 used by the ingestion pipeline 44 to determine the type of file being ingested, the originating location of the data file, processing patterns or parameters applicable to files correlated to the IDC template file 46, associated configuration files 23, etc. Continuing the example, if the data file being ingested correlates to certain specified criteria within a particular IDC template file 46, the ingestion pipeline 44 determines that the data file being ingested is processed in accordance with the template file 46.

In example embodiments, the template file 46 provides the format that the data file being ingested is expected to be stored in the computing resources 8 (e.g., the template file 46 identifies that the data file being ingested includes a set of customer addresses and directs the ingestion pipeline 44 to a configuration file 23 for formatting customer address files). In example embodiments, the template file 46 can include an IDC file which stores the format that the data file being ingested is stored on the on-premises system (e.g., the template file 46 stores the original format of the data file, for redundancy).

The ingestion pipeline 44 provides the data file to the ingestor 50 for processing. In example embodiments, the ingestion pipeline 44 provides the ingestor 50 with at least some parameters from the template file 46. For example, the ingestion pipeline 44 can provide the ingestor 50 with extracted properties of the data file in a standardized format (e.g., the data file has X number of entries, etc.).

The ingestor 50 processes the received data file based on an associated configuration file 23. In example embodiments, the ingestion pipeline 44 can provide the ingestor 50 with the location of an associated configuration file 23 for processing the data being ingested. The ingestion pipeline 44 can determine a subset of configuration files, and the ingestor 50 can determine the associated configuration file 23 based on the provided subset. In other example embodiments, the ingestor 50 solely determines the associated configuration file 23 based on the data file, and possibly based on information provided by the ingestion pipeline 44, if any. In example embodiments, the ingestion pipeline 44 can retrieve the associated configuration file 23 and provide the ingestor 50 with same.

The ingestor 50 retrieves the configuration file 23 from a metadata repository 25 having a plurality of configuration files 23. The metadata repository 25 includes various configuration files 23 having various configuration parameters for processing data files. Each configuration file 23 can be associated with a particular data file, or a group of related data files (e.g., a configuration file 23 can be related to a stream of data files originating from an application). The configuration parameters can be in the form of a JavaScript Object Notation (JSON) configuration file 23.

The configuration file 23 can include parsing parameters, and mapping parameters. The parsing parameters can be used by the ingestor 50 to find data within the data file, or more generally to navigate and identify features or entries within the data file. The parsing parameters of the configuration file 23 can define rules an ingestor 50 uses to determine a category applicable to the data file being ingested. Particularizing the example, the configuration file 23 can specify one or more parameters to identify a type of data, such as an XML file, an XSL Transformation (XSLT) or XML Schema Definition (XSD) file, etc., by, for example, parsing syntax within the received data file. In at least some embodiments, the configuration parameters can specify a type of data with greater particularly. For example, the configuration parameters, can specify that the data is transactional data related to stock trades which are typically in a particular format.

It is contemplated that the configuration file 23 can facilitate identification of the ingested data in a variety of ways, such as allowing for the comparison of data formats, metadata or labelling data associated with the data, value ranges, etc. of the ingested data with one or more predefined categories.

In at least some contemplated example embodiments, the parsing parameters of the configuration file 23 include one or more filtering parameters. The filtering parameters can specify which data within the data file is to be ingested into the remote computing environment 24 (e.g., a Cobol record filter for filtering certain string expressions). For example, the filtering parameter can specify that certain values within a data entry are not to be ingested (e.g., nonce characters at the beginning of a document, or file IDs specific to legacy on premises systems). In at least one example embodiment, the filtering parameters identify data entries which are dependent entries not to be ingested (e.g., variable linked entries or files are excluded).

The parsing parameters can also include parameters to facilitate extraction or manipulation of data entries into the format of the computing environment 24. For example, an example configuration file 23 can include parameters for identifying or determining information within a data file, such as the header/trailer, field delimiter, field name, etc. These parameters can allow the ingestor 50 to effectively parse through the data file to find data for manipulation into the standardized format, for example (e.g., field delimiters are changed).

The parsing parameters can include parameters to identify whether the data file is an incremental data file, or a complete data file. For example, where the data file is a daily snapshot of a particular on premises database (alternatively referred to as an iterative file), the parameters can define that the ingestor 50 should include processes to avoid storing redundant data. In the instance of the data file being a complete data file (alternatively referred to as a new file), the ingestor 50 can be configured to employ less demanding or thorough means to determine redundant data, if at all.

The mapping parameters can include one or more parameters associated with storing parsed data from the data file. For example, the mapping parameters can specify a location within the computing environment 24 into which the data file will be ingested. For example, the configuration file 23 can include or define the table name, schema, etc., used to identify the destination of the data file. The mapping parameters can define one or more validation parameters. For example, the mapping parameters can identify that each record has a record count property that must be validated.

The mapping parameters can include parameters defining a processing pattern for the data file. For example, the mapping parameters can allow the ingestor 50 to identify or determine file properties or types (e.g., different data sets can be stored using different file properties) and parameters defining how to process the identified file property type (e.g., copy books for mainframe files, etc.).

The ingestor 50 can be responsible for generating the configuration file 23. The configuration file 23 can be generated based on the template file 46 stored in the template repository 47 (e.g., upon receiving the template file 46 from the ingestion pipeline 44, or upon retrieving the template file 46 from template repository 47, etc.). For example, in instances where there is no associated configuration file 23 within the metadata repository 25, ingestor 50 can generated a configuration file 23 based on the template file 46 associated with the data being ingested. In at least some contemplated example embodiments, the ingestion pipeline 44 can retrieve associated template files 46 from template repository 47 and transmit same to the ingestor 50.

The ingestor 50 can generate the configuration file 23 based on the template files 46, or based on the template file 46 and data received from a user interface for processing metadata to create configuration files 23.

Figure 4:
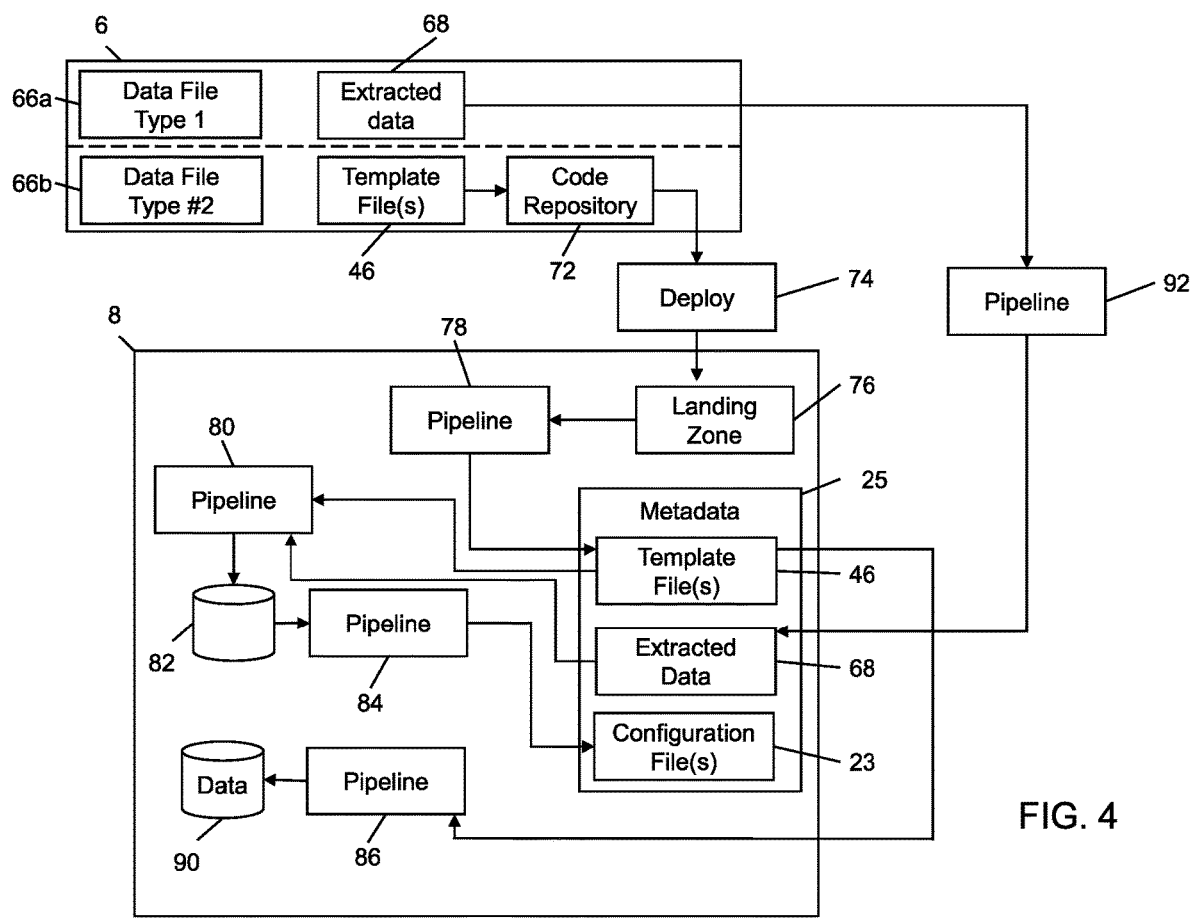
FIG. 4 is a schematic diagram of an example framework for generating configuration files for ingesting data into a remote computing environment.
Figure 5:
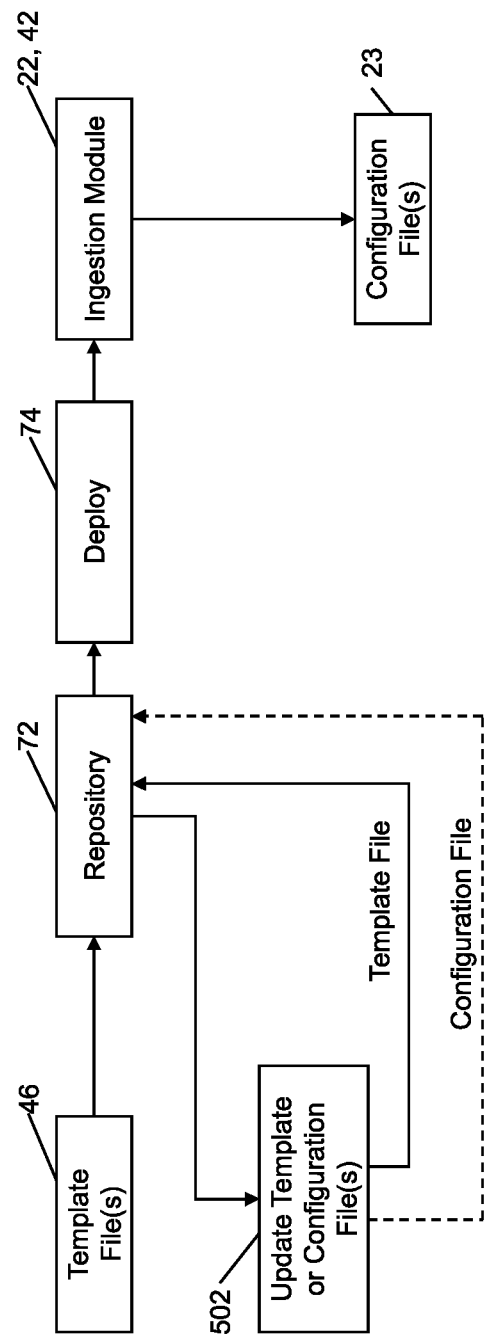
FIGS. 5 and 6 are each a schematic diagram of an example aspect of processing data files to create configuration files.
Figure 6:
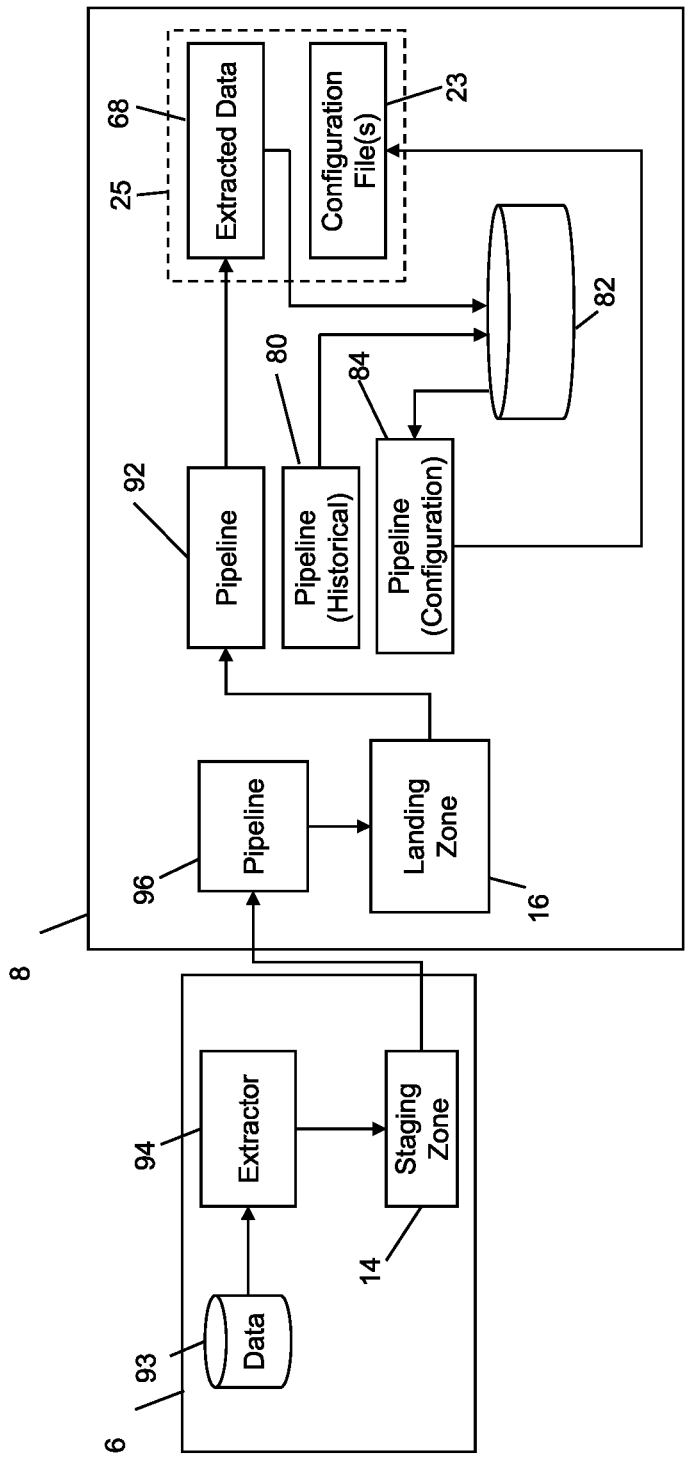

FIGS. 4 to 6 each depict a schematic diagram of an example framework for generating a configuration file 23 for ingesting data.

In FIG. 4, two different on-premises data file types are shown for illustration: extracted data 68 having the first data file type 66A, generated using legacy frameworks, and template file 46 having a second data file type 66B, generated by an on-premises system configured to integrate with the computing resources 8.

In contrast to the first data file type 66A, the second data file type 66B can be selected or created based on its interoperability with the computing resources 8. For example, data files of the second data file type 66B can be processed relatively easily to generate a template file 46. In example embodiments, the second data file type 66B is generated by an application which has been developed to implement the format enforced by the computing resources 8.

The template file 46 can be transmitted to a code repository 72 which is used to centralize management of template files 46. The use of the separate code repository 72 to manage template files 46 can potentially provide robustness to future solutions and/or decrease resources required to integrate changes by having all dependent processes refer to the code repository 72. For example, template files 46 can be updated (e.g., block 502 of FIG. 5), and the code repository 72 can deploy the updated template file 46 via an agent responsible for, and/or having authorization for updating template files or configuration files 23 within the metadata repository 25 or the template repository 47. In the embodiment shown in FIG. 5, the code repository 72 transmits the updated files for updating to the ingestion module 22, 42.

In another example embodiment, the code repository 72 can transmit the template file 46 to the computing resources 8 (e.g., shown via the deploy block 74) by transmitting same to a landing zone 76. The landing zone 76 can be configured to detect and pull new template files 46 stored within a container to which the code repository 72 has access, for example.

The landing zone 76 provides the template file 46, via a pipeline 78, to the metadata repository 25. In example embodiments as discussed herein, the template file 46 is temporarily stored in the metadata repository 25 to enable parallel processing, and to allow for designs permitting differential treatment of ingesting data files or different types (e.g., the template file 46 generated from the second data file type 66B can be given priority, or require less review or niched expertise to create).

In contrast to the second data type 66B, the first data type 66A is processed to extract data, shown by extracted data 68. The extraction of metadata from the first data type 66A can include extracting metadata and properties, similar to the process discussed in respect of block 32, and extracting historical data, similar to the process described in respect of block 34. In the example embodiment shown in FIG. 6, for example, metadata of data 93 can be extracted by an extractor 94, which may be a special purpose application or machine built to extract data from certain legacy data files.

Optionally, prior to the extracted data 68 entering the computing resources 8, the extracted data 68 may be processed via a pipeline 96 and landing zone 16, as shown in FIG. 6. The pipeline 96 and the landing zone 16 can be configured to require authentication for the extracted data 68 to be accepted within the computing resources 8. The pipeline 96 can comprise a plurality of different transmission channels, processors on servers, etc. that allow for transmission and processing of the extracted data 68.

The extracted data 68 can be provided to the metadata repository 25 via a pipeline 92 of a data factory. In example embodiments, the pipeline 92 can include compression or other manipulation of the extracted data 68 to render it suitable for storage and metadata repository 25.

The extracted data 68 is transmitted from the metadata repository 25 to the database 82 of the template repository 47. In example embodiments, after the extracted data 68 is transmitted from the metadata repository 25, it is removed from the metadata repository to avoid unnecessary storage.

In addition to the extracted data 68, template files 46 can be transmitted to via the pipeline 80 for loading into a database 82. In at least some contemplated embodiments, the database 82 is part of the template repository 47. In this manner, the template repository 47 can store formats used by the previous systems for troubleshooting of potential issues in the future.

As is shown, separate pipelines can instantiated to load and process template files 46 and extracted data 68, to allow for parallel processing. In addition, by loading template files 46 and extracted data 68 separately, the framework can be adjusted to allow for desirable performance for the different file types. For example, greater resources may be assigned for loading template files 46 being generated for existing business as compared to legacy data and the associated extracted data 68.

Template files 46 and extracted data 68 within the database 82 can be converted into configuration files 23 via the pipeline 84. In example embodiments, the pipeline 84 includes the ingestion module 22, 42 (e.g., as shown in FIG. 5), processing the template file 46 or the extracted data 68 to automatically generate the configuration file 23. In at least some contemplated embodiments, the pipeline 84 includes the ingestion pipeline 44 generating the configuration files 23.

Figure 7:
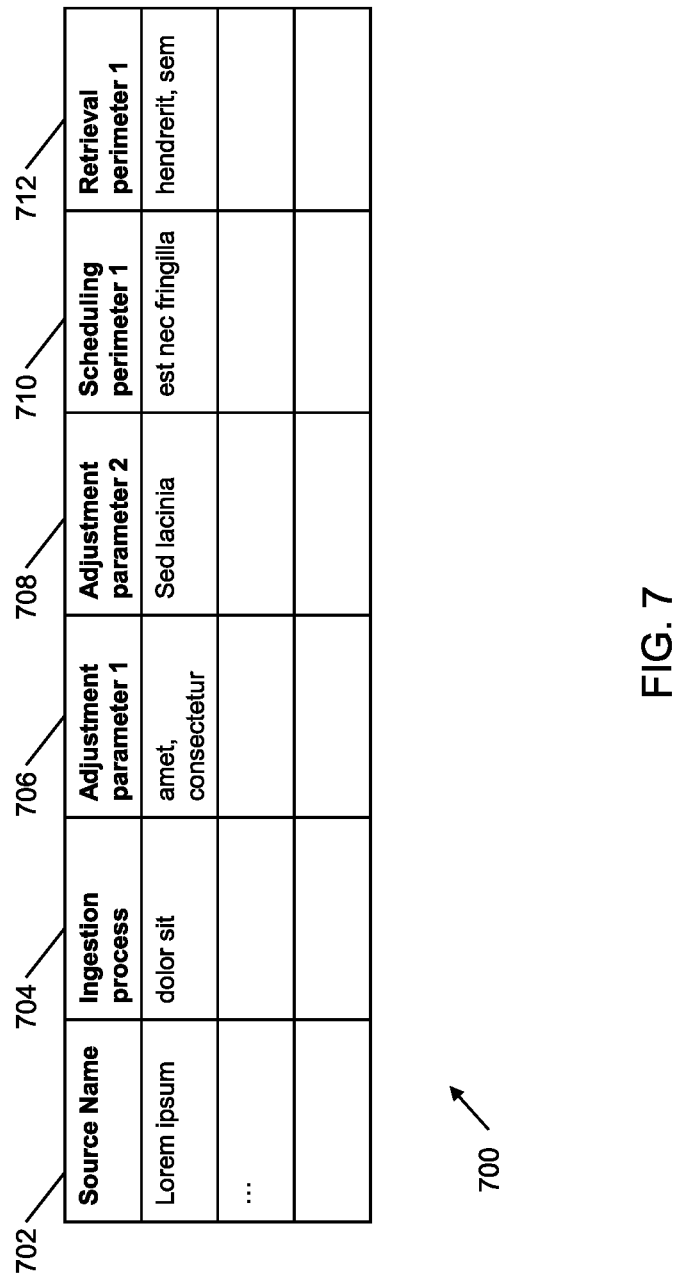
FIG. 7 is a diagram of an example embodiment of a template for processing metadata to create configuration files.

As alluded to herein, the configuration file 23 can be generated based on input received from a user interface. FIG. 7 shows an example template 700 for the user interface to receive input to generate configuration files 23.

The template 700 can include a plurality of columns which require the user to define various parameters of the configuration file 23. In the shown embodiment, the template 700 requires the user to enter, via: column 702, a source of the data being ingested; column 704, a preferred ingestion process (e.g., as a data file being uploaded a "snapshot" data file, and as such requires filtering to discard duplicate or redundant data, or as the data file being uploaded a complete data file, with all data entries presumed to be new); and, columns 706 and 708, adjustment parameters for manipulating data entries within the data file (e.g., removal of certain blank spaces, identification of delimiters, location of relevant copy books, etc.).

The template 700 includes further parameters associated with other than parsing or mapping the data file. For example, the shown template 700 may require the user to enter, via: column 710, parameters in respect of scheduling the data file to be ingested (e.g., after business hours, during a scheduled time, to the scheduled channel, etc.); and, column 712, relationship parameters defining interdependencies associated with the configuration file 23 (e.g., which files should be associated with the configuration file 23, a location where an updated configuration file 23 can be retrieved, etc.). These parameters can be provided to an orchestration database 90, via pipeline 86 (FIG. 4), which database 90 can be accessed by the ingestor 50 or other scheduling application.

The various pipelines described in FIGS. 4 to 6 can transmit to, or be monitored by, a status application which manages the deployment of the configuration file 23. The status application can notify actors within the computing resources 8 of the completion of a new configuration file 23. For example, the status application can be in communication with the ingestor 50 to prompt the ingestor 50 to recover new configuration file 23 once created.

Referring again to FIG. 3, the ingestor 50 processes the data files with the configuration file 23 for writing to remote storage, including at least one of processing (e.g., standardizing), and validation. For example, the ingestor 50 of the computing environment 64 can be responsible for processing received data files into a particular standardized format based on the configuration file 23 with a processor 52. The ingestor 50 can be responsible for validating data files with the configuration file 23 with a validator 54 and writing data files for storage with the writer 56. The ingestor 50 can write the data files being ingested into the computing environment 24, into one of a current representation 58 of the data file, a previous representation 62 of the data file, and an invalid representation 60 of the data file.

By keeping configurations in the form of the configuration file(s) 23 in the metadata repository 25, separate from the template repository 47, retrieval efforts (e.g., computational resources, latency) can be reduced. The reduction in retrieval efforts can potentially become significant in instances where vast amounts of data being migrated to the computing resources 8.

Although the ingestor 50 is shown separate from the processor 52, the validator 54, and the writer 56, it is understood that these elements may form part of the ingestor 50. For clarity, the processor 52, validator 54, and writer 56 may be libraries which the ingestor 50 has access to, to implement the functionality defined by the respective library. Similarly, the ingestor 50, the processor 52, validator 54, and writer 56 being shown as part of a single remote environment 24 is understood to be illustrative and non-limiting.

Figure 8:
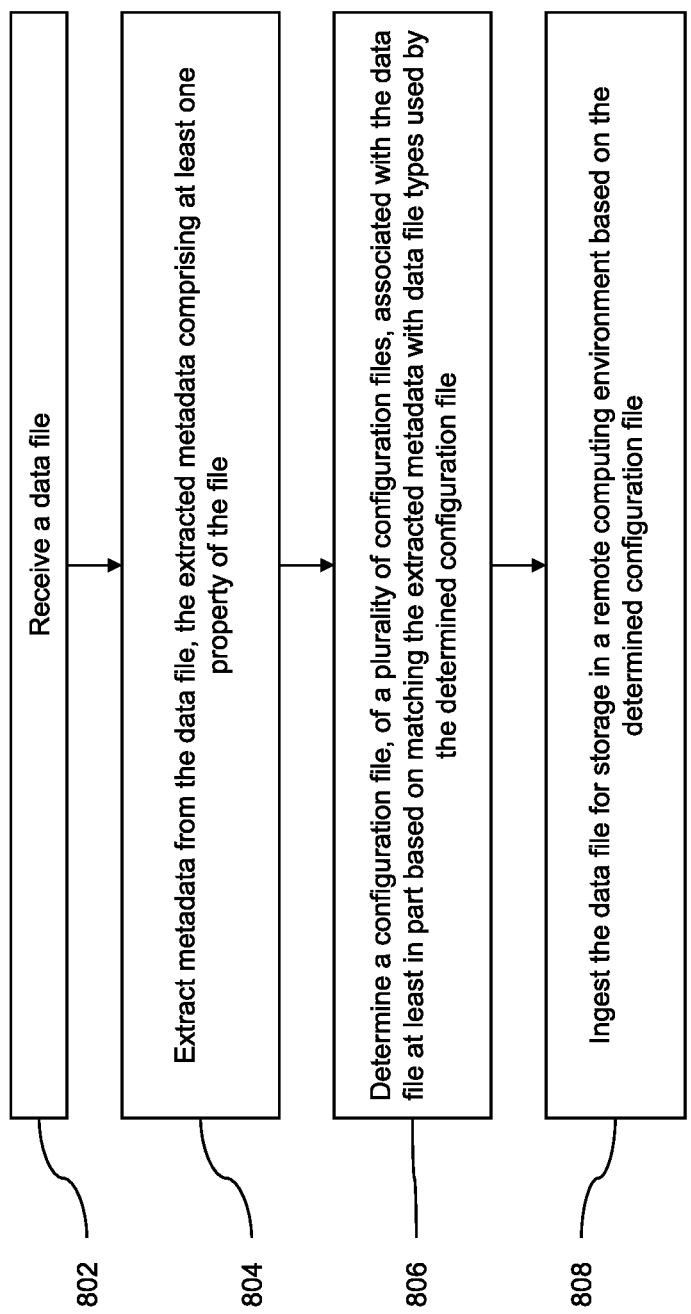
FIG. 8 is a flow diagram of an example method for ingesting data into remote computing environments.

FIG. 8 is a flow diagram of an example method for ingesting a plurality of data into a remote computing environment. For ease of illustration, reference shall be made to elements of the preceding figures to discuss the example flow diagram. It is understood that such reference is not intended to be limiting.

At block 802, a data file is received within the computing resources 8. The data file can be from any of a plurality of systems within the enterprise system 6. In example embodiments, the data file is a new data file generated by on-premises systems utilizing a legacy architecture. In another example embodiments, the data file is a new data files generated for the purposes of updating the computing resources 8.

The data files can be pulled from the enterprise system 6, or in the alternative, the data files are pushed into a server of the computing resources 8.

In at least some contemplated example embodiments, the method includes transferring the received data files from a first landing zone (e.g., landing zone 16) into a second landing zone (e.g., landing zone 20) associated with an environment in which processed data files are stored. The use of multiple landing zones can potentially provide for a robustness within the disclosed framework. For example, less storage infrastructure may be assigned to the first landing zone, where relatively less storage is expected to be required owing to data files being stored on a temporary basis, as compared to the second landing zone. In instances where the second landing zone is closer to the location of processing (e.g., the ingestion module 22), an application can schedule the transmission of data from the first landing zone to the second landing zone to ensure that the second landing zone is not overwhelmed, introducing undesirable latency. In another example, one or more preliminary processes may be implemented on the data files in the first landing zone prior to the data files entering the second landing zone. For example, the first landing zone can be configured to determine whether the transmitted data file includes appropriate template files 46 within the template repository 47.

In example embodiments, greater security infrastructure is assigned to the first landing zone. For example, the landing zone 16 can require authentication and be associated with or have access to infrastructure to implement, for example, an access token scheme.

At block 804, the metadata is extracted from the received data file. In example embodiments, the metadata takes the form of extracted data 68. In other example embodiments, the extracted metadata is a template file 46. While this disclosure refers to extracted data 68 and the template file 46 separately, they may be referred to interchangeably as extracted metadata. The extracted metadata includes at least one property of the data file (e.g., a header identifying a particular column, etc.).

At block 806, a configuration file 23 from a plurality of configuration files 23 is determined, where the configuration file 23 is associated with the data file. The configuration file 23 can be determined by at least in part based on correlating the extracted metadata with data file types used by the determined configuration file 23. Various manners of correlating extracted metadata with configuration files 23 are contemplated. In one example embodiment, the extracted metadata can be used to determine whether the data file is a mainframe file, and its source, and the configuration file 23 can be associated with those identifying parameters. In another example embodiment, the metadata may specify a relation to previously ingested data, and the ingestor 50 can process the data file (e.g., an additional data file) with the configuration file 23 used to ingest the previously ingested data.

At block 808, the data file is ingested into the remote computing environment 24 based on the configuration file 23. For example, the configuration file 23 can specify any adjustment parameters required to store the data file in the standardized format of computing environment 24.

Figure 9:
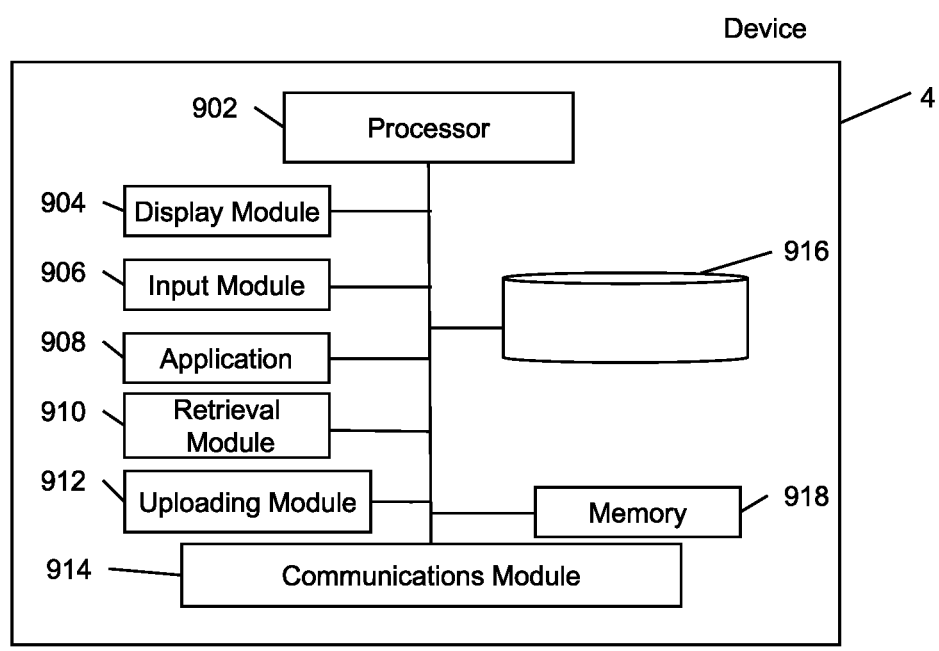
FIG. 9 is a block diagram of an example configuration of a device.

Referring now to FIG. 9, an example configuration of a device 4 is shown. It can be appreciated that the device 4 shown in FIG. 9 can correspond to an actual device or represent a simulation of such a device 4. The shown device 4 can be an internal device, used to implement the functionality of the enterprise system 6 described herein, or an external device, used to implement the functionality of the computing resources 8 as described herein, or a device 4 to access either of the enterprise or the remote computing systems. The device 4 can include one or more processors 902, a communications module 914, and a data store 916 storing data (e.g., for data files for uploading, or for template files 46, etc.).

Communications module 914 enables the device 4 to communicate with one or more other components of the computing environment 2 via a bus or other communication network, such as the communication network 10. The device 4 includes at least one memory 918 or memory device that can include a tangible and non-transitory computer-readable medium having stored therein computer programs, sets of instructions, code, or data to be executed by processor 902. FIG. 9 separately illustrates examples of modules and applications stored in memory 918 on the device 4 and operated by the processor 902. It can be appreciated that any of the modules and applications shown in FIG. 9 may also be hosted externally and be available to the device 4, e.g., via the communications module 914.

In the example embodiment shown in FIG. 9, the device 4 includes a display module 904 for rendering graphical user interfaces (GUI) and other visual outputs on a display device such as a display screen (e.g., a user interface based on template 700), and an input module 906 for processing user or other inputs received at the device 4, e.g., via a touchscreen, input button, transceiver, microphone, keyboard, etc. The shown device 4 also includes one or more applications (shown as the singular application 908) that generates data for uploading to a remote computing environment, or for scheduling data to be processed by the processors of the computing resources 8. The device 4 may include a retrieval module 910 to extract historical data from the device 4 or the enterprise system 6 for uploading to the remote computing environment. For example, the retrieval module 910 can be used to identify data related to the data being uploaded, e.g., related historical data. The uploading module 912 enables the device 4 to interface with the remote computing environment 8, or a subset thereof, to transfer data to the remote computing environment 8. The data store 916 may be used to store data, such as, but not limited to, an IP address or a MAC address that uniquely identifies device 4. The data store 916 may also be used to store data ancillary to transmitting data to the computing environment 8, such as, but not limited to, login credentials, user preferences, cryptographic data (e.g., cryptographic keys), etc.

Figure 10:
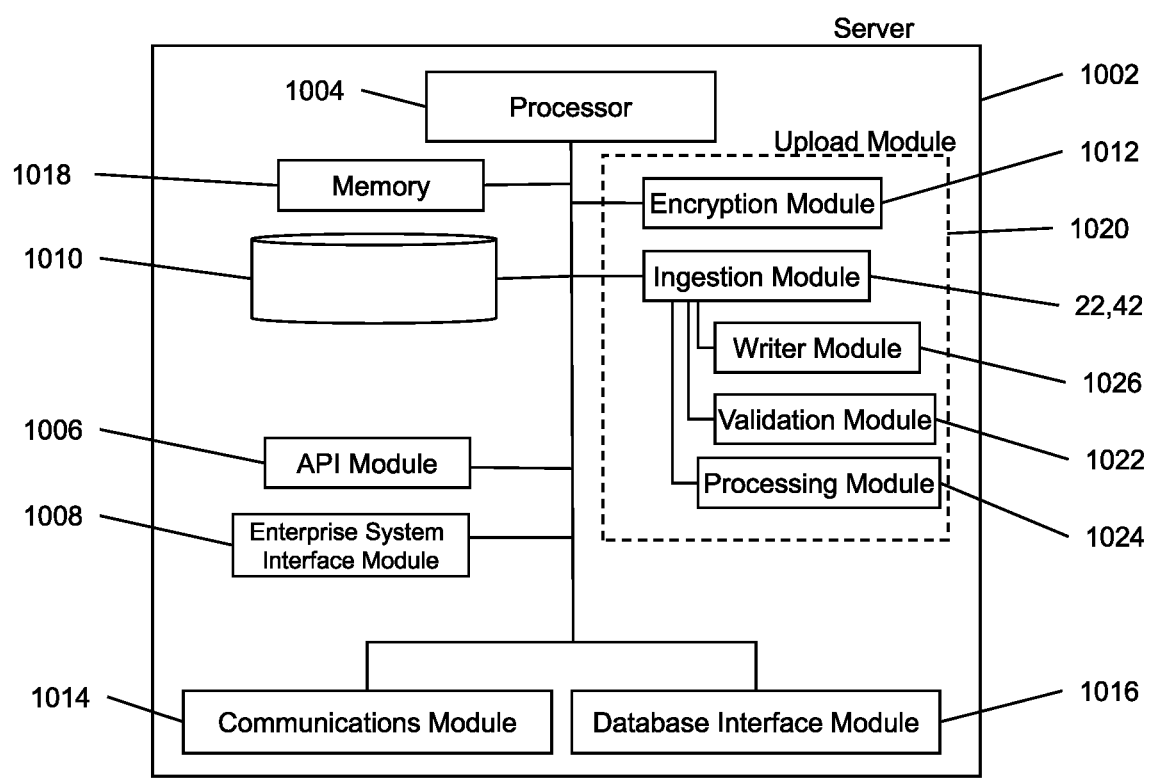
FIG. 10 is a block diagram of an example server of a remote computing environment.

Referring to FIG. 10, an example configuration of a server 1002 implementing the functionality of the remote computing environment 8 is shown. It can be appreciated that the server 1002 shown in FIG. 10 can correspond to an actual device, or represent a simulation of such a server 1002, or represent a configuration of multiple servers cooperating to provide the requisite functionality. The server 1002 can include one or more processors 1004, a communications module 1014, and a data store 1010 (e.g., for storing the template file 46, and/or the configuration file 23 of the metadata repository 25, and the data files, etc.), and a database interface module 1016.

Communications module 1014 enables the server 1002 to communicate with one or more other components of the remote computing environment 8 or the enterprise system 6 via a bus or other communication network, such as the communication network 10. The server 1002 includes at least one memory 1018 or memory device that can include a tangible and non-transitory computer-readable medium having stored therein computer programs, sets of instructions, code, or data to be executed by processor 1004. FIG. 10 separately illustrates examples of modules and applications stored in memory 1018 on the server 1002 and implemented or persisted by the processor 1004. It can be appreciated that any of the modules and applications shown in FIG. 10 may also be hosted externally and be available to the server 1002, e.g., via the communications module 1014.

In the example embodiment shown in FIG. 10, an application programming interface (API) module 1006, for facilitating communication between the server device 1002 and other remote computing environments (e.g., example embodiments where the remote computing environment 24 is hosted externally to server 1002), or for facilitating communication between the server 1002 and a device 4

(whether an internal or external device 4), or for facilitating communication between the server 1002 and a specific application, and so forth. The server 1002 may also include an enterprise system interface module 1008 whose sole purpose is to facilitate communication with the enterprise system 6.

The server 1002 includes an upload module 1020 for ingesting data, including generating configuration files 23. The upload module 1020 can include the ingestion module 22, 42, which illustratively includes the functionality to validate data files, via the validation module 1022, and to process data files and/or to generate the configuration file 23 from the template file 46, via the processing module 1024. The ingestion module 22, 42 can also write data to the remote environment with the writer module 1026. The ingestion module 22, 42 can also search, change, store, or otherwise manipulate data files for transmission or for the purpose of storing the data.

The encryption module 1012 can encrypt data in a variety of manners prior to the data representations being stored. For example, the encryption module can encrypt data once it has been validated. In at least some example embodiments, the data being ingested is already encrypted, and the encryption module 1012, in cooperation with a complementary encryption module on the device 4 or on-premises (not shown), decrypts the data for ingestion so that any data transmitted between the premises and the remote computing environment 8 is encrypted.

The database interface module 1016 facilitates communication with databases used to store the ingested data. For example, the database interface module 1016 can be used to communicate with database 82 to retrieve a template file 46, which in the example embodiment is not stored on server 1002. The data store 1010 may be used to store data, such as, but not limited to, an IP address or a MAC address that uniquely identifies server 1002. The data store 1010 may also be used to store data ancillary to transmitting or receiving data within the computing environment 8, such as, but not limited to, login credentials, user preferences, cryptographic data (e.g., cryptographic keys), etc.

Figure 11:
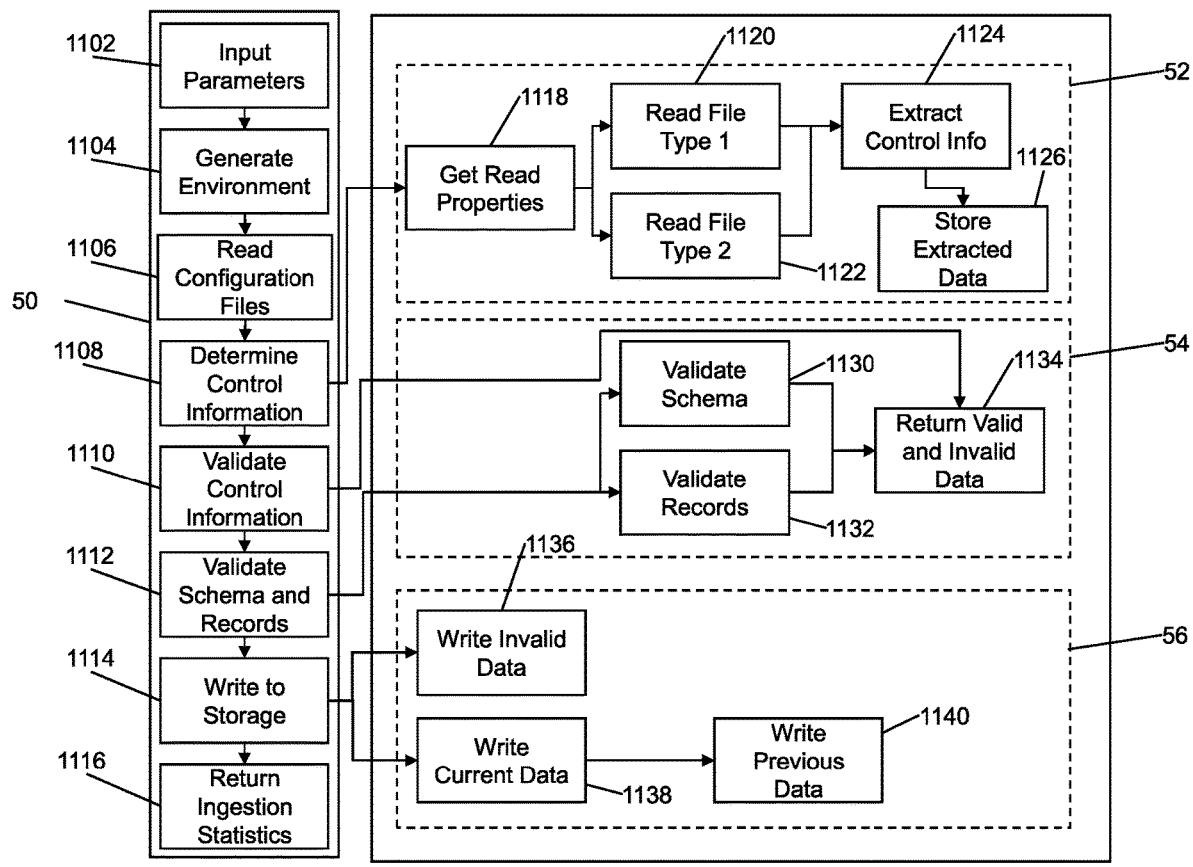
FIG. 11 is a flow diagram of an example method for ingesting a plurality of data files into a remote computing environment.

Referring now to FIG. 11, a flow diagram of an example method for ingesting a plurality of data files into a remote computing environment is illustrated. For ease of illustration, reference shall be made to elements of the preceding figures to discuss the example flow diagram. It is understood that such reference is not intended to be limiting.

At block 1102, the ingestor 50 receives the data file and any associated parameters (e.g., information designating a server 1002, a template file 46, etc.).

At block 1104, the ingestor 50 generates the computing environment where the data file will be processed. Generating the computing environment can include scheduling the use of the determined processor, storage capacity, etc.

At block 1106, the ingestor 50 reads or loads one or more configuration files 23 from the metadata repository 25. In example embodiments, the one or more configuration file 23 can represent a subset of all configuration files 23 stored on the metadata repository 25. For example, the subset can be a filtered subset based on parameters within the template file 46 associated with the data file. Particularizing the example, the template file 46 can specify the source of the data file, narrowing the plurality of configuration files 23 (e.g., a single configuration file 23) to the subset of configuration files 23 transmitted to the ingestor 50 based on association with the specific source and data file. The configuration file(s) 23 can be loaded in closer proximity to the processor instantiating the ingestor 50 to reduce latency.

At block 1108, the ingestor 50 determines the validation parameters (e.g., control information) used to ingest the data file.

As shown in block 1118, determining the control information to ingest the data file can include retrieving any properties or tools required to read the data file. In example embodiments, the properties are specified in the configuration file 23. In at least some example embodiments, the properties or tools are identified by the configuration file 23, and can be retrieved by the ingestor 50. The properties or tools can include, for example, Cobrix Libraries needed to process the data file, or data identifying the delimiter using the delimiter file, etc.

Blocks 1120 and 1122 demonstrate an aspect of the modularity of the proposed framework. Each of block 1120 and 1122 define a path travelled by different file types. Block 1120 can represent an XML file type, whereas block 1122 can represent another file type.

At block 1124, the processor 52 extracts control information from the data file.

At block 1126, the processor 52 stores extracted control information for use to validate the data file. For example, the control information can be stored, possibly temporarily to avoid storage fees, in metadata repository 25 or template repository 47.

At block 1110, the extracted control information is used to validate the data file.

At block 1112, the schema of the data file and/or entries in the data file are validated. For example, the validator 54 can determine whether entries are invalid (block 1132). In another example, the validator 54 can determine whether the data file satisfies a schema (e.g., enforced by the remote computing environment 24) for storing data files remotely (block 1130). For example, the schema can specify that the data file includes certain columns (e.g., entries requiring the completion of certain regulatory requirements), that entries in the data file adhere to certain formats (e.g., date files are stored as mm/dd/yyyy) etc.

At block 1134, the data file is parsed into validated and invalid data for subsequent writing into the computing environment 24. The data file can be wholly invalid, or include entries which are invalid.

At block 1114, the data file (assuming that it is validated) is written into the computing environment 24. As shown in blocks 1138 and 1136, the valid and invalid data can be written to separate destinations (e.g., as defined by the configuration file 23), a current representation of the data set and an invalid representation of the data set, respectively.

The ingestor 50 can determine, during the course of writing data pursuant to block 1136 or otherwise, that the data file will displace or replace information in the current representation. For example, the data file can update the ownership of a particular security. The ingestor 50 can be configured to write any displaced or replaced information into a previous representation of the data set in block 1140

At block 1116, the ingestor 50 transmits ingestion statistics (e.g., time to process the data file, number of entries found invalid, etc.), including tracking data, for storage. For example, the ingestion statistics and tracking data can be sent to the template repository 47 for storage.

Figure 12A:
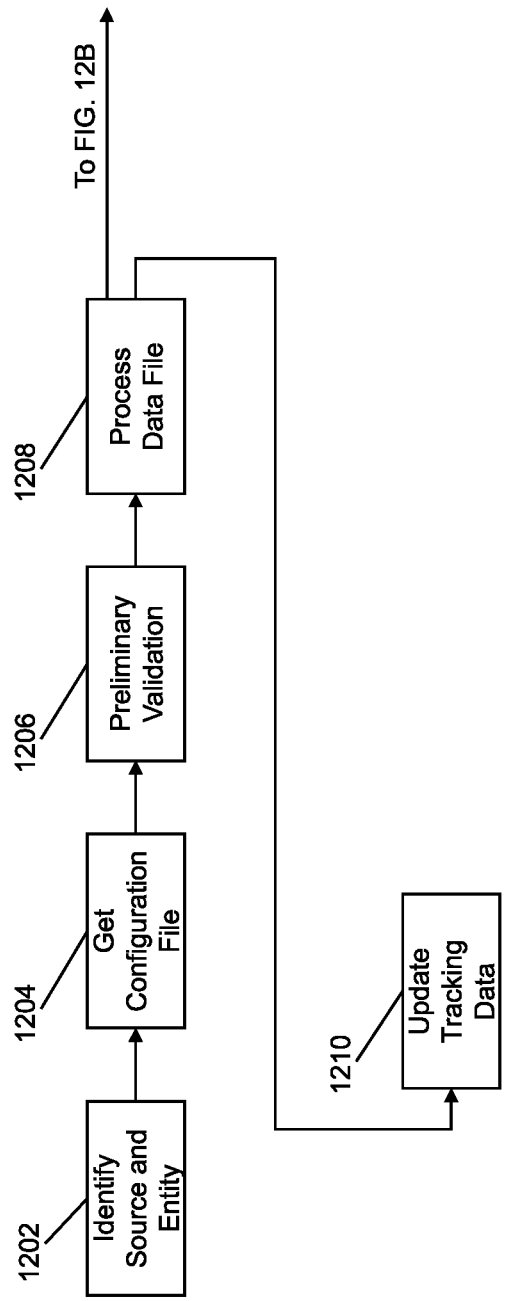
FIGS. 12A and 12B illustrate a flow diagram of another example method for ingesting a plurality of data files into a remote computing environment.
Figure 12B:
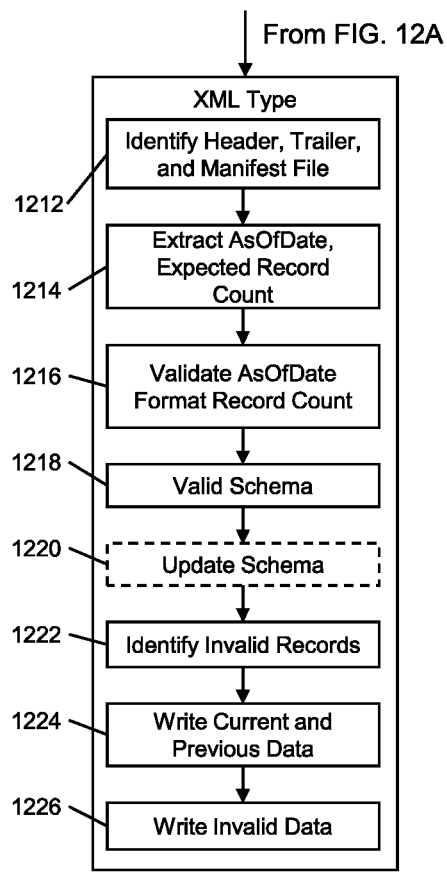

FIGS. 12A and 12B illustrate a flow diagram of another example method for ingesting a plurality of data files into a remote computing environment. For ease of illustration, reference shall be made to elements of the preceding figures to discuss the example flow diagram. It is understood that such reference is not intended to be limiting.

At block 1202, the source of the data file (e.g., a particular computing resource of the enterprise system 6, such as server X) and the entity associated with the data file (e.g., a subsidiary, or finance division of the enterprise system 6, etc.) are identified. In example embodiments, the source and entity are identified in the template file 46 by the ingestion pipeline 44, or the ingestor 50, or a combination thereof.

At block 1204, the configuration file 23 associated with the source and the entity is retrieved or transmitted to the ingestor 50. For example, the metadata repository 25 can allow for filtering the plurality of configuration files 23 by source and entity. This approach can advantageously require siloed data in on prem systems in order to integrate with the configuration file 23 based ingestion framework, which may reduce the risk associated with data being lost or inadvertently accessed.

At block 1206, the ingestor 50 performs a preliminary validation. The preliminary validation can include determining whether the configuration file 23 is the most up to date configuration file 23 associated with the data file.

At block 1208, the ingestor 50 processes the data file with the determined configuration file 23.

FIG. 12B illustrates example processing for an XML data file type. The example is understood to not be limiting, and other configuration files 23 for use to process other XML files in a different manner, or any other data file type, are contemplated.

At block 1212, the configuration file 23 is used to identify a header and trailer in the data file, and a manifest file. The identification of these features of the data file can allow the ingestor 50 to identify entries, for example by reference to the identified elements (e.g., information following the header is an entry, etc.).

At block 1214, the data file is parsed to identify control information including an AsOfDate property, identifying when the data file was created, and an Expected Record Count property, identifying the number of entries in the data file to be uploaded.

At block 1216, the properties identified in block 1214 are validated.

At block 1218, the ingestor 50 can validate that the schema which the data file is required to comply with, is up to date. In example embodiments, the ingestor 50 determines whether the data file complies with the schema.

Optionally, at block 1220, if the schema allows for updating, and the data file proposes to update the data schema, the schema is updated.

By allowing the data file to update the schema used to store the data set in the computing environment 24, the ingestion module 22, 42 can be responsive to changing circumstances. For example, the ingestion module 22, 42 can quickly adopt new schemas by processing a data file to change the schema, instead of using a separate process to update schemas. This compartmentalization also avoids delays to configure the ingestion module 22, 42 to seek out new schemas.

At block 1222, the ingestor 50 identifies any invalid records within the data file. The configuration file 23 can provide parameters to determine which records are invalid.

At block 1224, the ingestor 50 can write valid data within the data file to a current representation of a data set associated with the data file. Data which is displaced by the new data within the data file can be written into a previous representation of the data file.

Referring again to FIG. 12A, at block 1210, the ingestor 50 can update the tracking data to incorporate writing of the data file.

It will be appreciated that only certain modules, applications, tools, and engines are shown in FIGS. 2, 3, 9 and 10 for ease of illustration and various other components would be provided and utilized by the device 4, enterprise system 6, and/or the remote computing environment 8, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 2, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for ingesting data into remote computing environments, the device comprising:
   a processor;
   a communications module coupled to the processor; and
   a memory coupled to the processor, the memory storing computer executable instructions that when executed by the processor cause the processor to:
      receive a plurality of data files, the plurality of data files including at least two heterogeneous file types;
      extract metadata from each of the plurality of data files, the extracted metadata comprising at least one property of the respective data file;
      for each data file, determine a configuration file, from a plurality of configuration files, by correlating the extracted metadata with the corresponding data file type that is processed by the determined configuration file; and
      ingest the data file for storage in a remote computing environment based on the determined configuration file;

wherein the extracted metadata is stored in a database, the determined configuration file is stored in a separate file, and the processor accesses the determined configuration file to ingest data.

2. The device of claim 1, wherein at least one of the plurality of data files is received from one or more on-premises systems using a landing zone.

3. The device of claim 1, wherein the determined configuration file includes one or more validation parameters for validating the data file during ingestion.

4. The device of claim 1, wherein the computer executable instructions cause the processor to:
ingest for storage in the remote computing environment, based on the determined configuration file, an additional data file associated with the data file.

5. The device of claim 1, wherein the determined configuration file comprises parsing parameters and mapping parameters for storing parsed data from the data file in the remote computing environment.

6. The device of claim 5, wherein the parsing parameters comprise at least one of filtering parameter to identify data that is not being ingested.

7. The device of claim 5, wherein the mapping parameters comprise one or more parameters defining a destination of the ingested data file and one or more processing pattern parameters for the data file.

8. The device of claim 7, wherein the one or more processing pattern parameters identify whether the data file is an iterative data file or a new data file.

9. The device of claim 1, the computer executable instructions cause the processor to:
use the extracted metadata to generate a new configuration file for the data file, and
wherein the determined configuration file for ingestion is the new configuration file.

10. The device of claim 9, wherein the determined configuration file is generated based on the extracted metadata and parameters provided via a user interface.

11. The device of claim 10, wherein the user interface is based on a template for processing metadata to create configuration files.

12. The device of claim 1, wherein the computer executable instructions cause the processor to:
store the plurality of configuration files and make the plurality of configuration files accessible to a data ingestion process, wherein the plurality of configuration files are adapted and updated over time separately from the data ingestion process.

13. A method for ingesting data into remote computing environments, the method comprising:
receiving a plurality of data files, the plurality of data files including at least two heterogeneous file types;
extracting metadata from each of the plurality of data files, the extracted metadata comprising at least one property of the respective data file;
for each data file, determining a configuration file, from a plurality of configuration files, by correlating the extracted metadata with the corresponding data file type that is processed by the determined configuration file; and
ingesting the data file for storage in a remote computing environment based on the determined configuration file;
wherein the extracted metadata is stored in a database, the determined configuration file is stored in a separate file, and the processor accesses the determined configuration file to ingest data.

14. The method of claim 13, wherein at least one of the plurality of data files is received from one or more on-premises systems using a landing zone.

15. The method of claim 13, wherein the determined configuration file includes one or more validation parameters for validating the data file during ingestion.

16. The method of claim 13, further comprising:
ingesting an additional data file associated with the data file for storage in the remote computing environment, based on the determined configuration file.

17. The method of claim 13, wherein the determined configuration file comprises parsing parameters and mapping parameters for storing parsed data from the data file in the remote computing environment.

18. The method of claim 17, wherein the parsing parameters comprise at least one of filtering parameter to identify data that is not being ingested.

19. The method of claim 13, further comprising:
storing the plurality of configuration files and make the plurality of configuration files accessible to a data ingestion process, wherein the plurality of configuration files are adapted and updated over time separately from the data ingestion process.

20. A non-transitory computer readable medium for ingesting data into remote computing environments, the computer readable medium comprising computer executable instructions for:
receiving a plurality of data files, the plurality of data files including at least two heterogeneous file types;
extracting metadata from each of the plurality of data files, the extracted metadata comprising at least one property of the respective data file;
for each data file, determining a configuration file, from a plurality of configuration files, by correlating the extracted metadata with the corresponding data file type that is processed by the determined configuration file; and
ingesting the data file for storage in a remote computing environment based on the determined configuration file;
wherein the extracted metadata is stored in a database, the determined configuration file is stored in a separate file, and the processor accesses the determined configuration file to ingest data.

* * * * *